April 24, 1962  P. FORTESCUE ETAL  3,031,397
REACTOR CONTROL
Filed Aug. 7, 1958
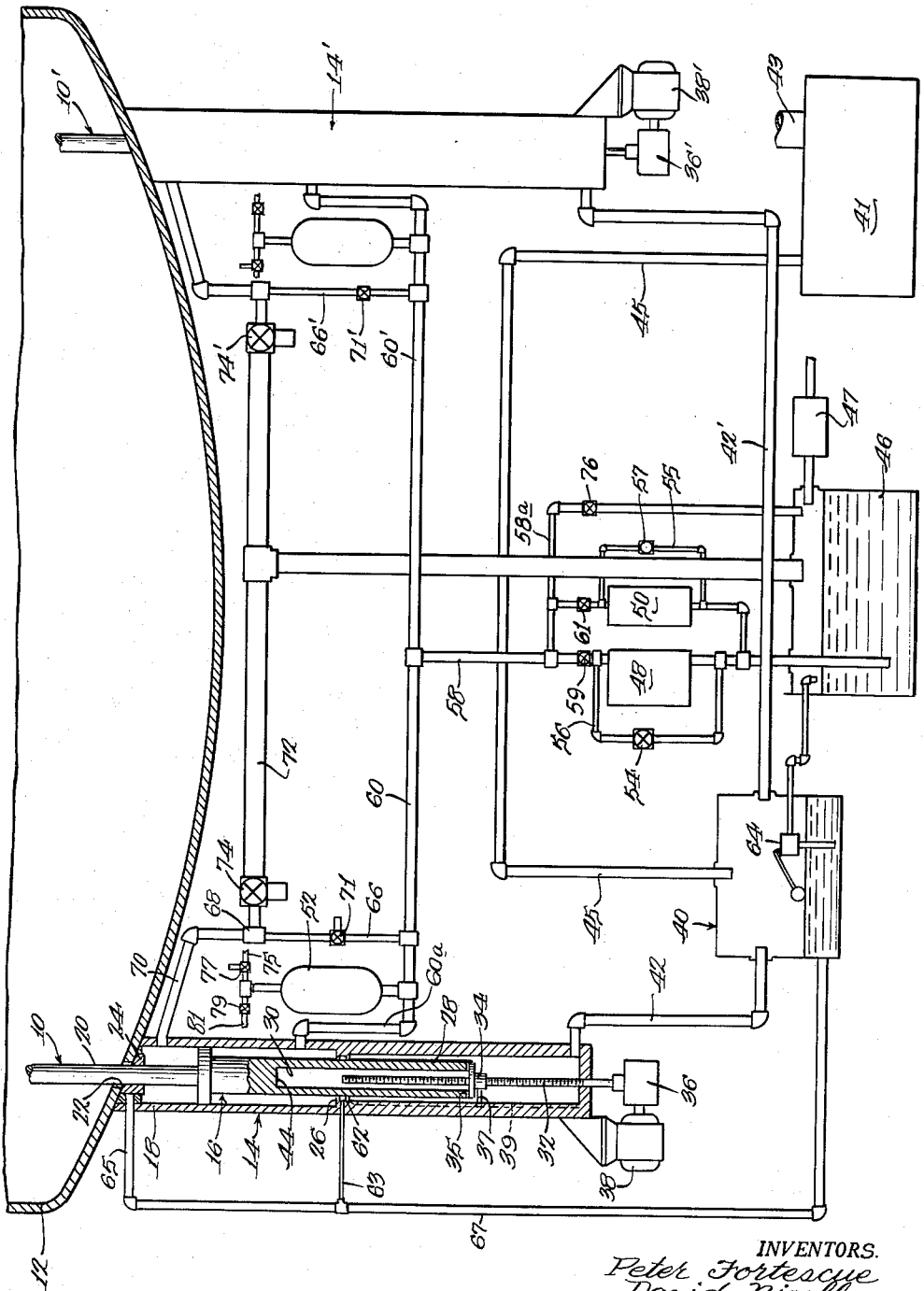
INVENTORS.
Peter Fortescue
David Nicoll
BY
Soans, Anderson, Luedeka & Fitch
Attys.

United States Patent Office 3,031,397
Patented Apr. 24, 1962

3,031,397
REACTOR CONTROL
Peter Fortescue, La Jolla, and David Nicoll, Del Mar, Calif., assignors, by mesne assignments, to the United States of America as represented by the United States Atomic Energy Commission
Filed Aug. 7, 1958, Ser. No. 753,770
5 Claims. (Cl. 204—193.2)

This invention relates generally to neutronic reactors and is more particularly directed to safety control means for effecting substantially instantaneous shut-down of a neutronic chain reaction in the event of an emergency.

It is understood that in neutronic reactors means must be provided for regulating or controlling a self-sustaining neutron chain reaction in the system, and this is ordinarily achieved by moving control rods of neutron absorbing material into and out of the neutronic reacting system. As a safety device, it is imperative that such control rod regulating means include means whereby a sufficient number of the neutron-absorbing control rods are substantially instantaneously moved into the neutron field upon development of a dangerous neutron level within the field. This is frequently referred to as "scramming" the reactor. Various means have been devised for providing this essential safety precaution, and one of the more common systems for emergency movement of control rods into a reactor employs the movement of the control rods by gravity into the neutron field. While this means has been effective and has the advantage of being independent of any power source for its emergency operation, it also has certain disadvantages. The speed at which the control rods move by gravity into the neutron field is, of course, limited and substantially constant and, in some instances, a greater speed is desirable. Furthermore, such means necessarily requires that the control rods move relative to a position of support from above the core of the reactor. Obviously, if the control rods are supported from a position above the reactor core, a substantial portion of the zone overlying the core is occupied by control rod supporting and control means. In many instances, it is desirable that this zone above the core be left open and available for other devices.

It is a primary object of this invention to provide a novel form of safety control means for a neutronic reactor, wherein the control rods of neutron absorbing material are movable into the neutron field, in response to a predetermined neutron level in the reactor and through the use of the operating pressure present in the reactor system. A further object of this invention is to provide safety control means for a neutronic reactor that is cooled by a pressurized gas, wherein the pressure of the reactor coolant is utilized to immediately move control rods into the neutron field, from a position therebelow, in response to the creation of a dangerous operating condition in the neutronic reactor. Still another object of the invention is to provide a control means for a plurality of control rods for a neutronic reactor, including the use of a differential fluid-pressure piston for effecting movement of each of the control rods, wherein the piston is subjected to different fluid pressures on opposite sides thereof, with the fluid pressure on the lower side of the piston being derived from the pressure in the reactor vessel, and wherein the fluid pressure on the upper side of the piston is removed in response to the attainment of a dangerous condition in the reactor to thereby enable the reactor pressure to move each control rod into its full position within the neutron field.

Another object of the invention is to provide a control rod drive system including a combination of electro-mechanical, hydraulic, and pneumatic force producing means for moving the control rod relative to the neutron field, wherein the drive means affords regulation of the control rod position during ordinary operation of the reactor and is also effective to automatically scram the control rod, in response to a predetermined neutron level in the reactor, independently of the operation of the electro-mechanical and hydraulic force producing means in the system.

Other objects and advantages will be come apparent from the following description of a preferred embodiment of the invention illustrated schematically in the accompanying drawing.

Generally, the invention comprises a novel arrangement for the utilization of reactor pressure, such as that present in the cooling system of a gas-cooled reactor, to provide means for substantially instantaneously moving the control rods into the core of the neutronic reactor in response to the attainment of a dangerous operating condition in the reactor. Although such means is perhaps most advantageous in connection with a control rod system wherein the control rods are not moved by gravity into a position of safety within the neutron field, it is conceivable that the invention described herein may also have utility in connection with a control rod system of the type wherein the control rods are moved by gravity relative to the reactor core from a position above the core. Furthermore, it is contemplated that a safety control system of the type described herein may be utilized to advantage, either alone or in combination with other forms of safety control means.

In the embodiment selected to illustrate the principles of this invention, one or more control rods 10 are disposed for vertical movement relative to the neutronic field within a reactor vessel 12 from a position below the vessel. Although the invention will be described primarily with respect to means for moving a single control rod, it will be understood that, if desired, a plurality of control rods may be similarly controlled. In this respect, the drawing includes a general illustration of a second control rod and drive means in the system, to thereby show the adaptability of the system to a plurality of control rod drive means, and portions of the second control rod drive which correspond to portions of the described drive means are similarly numbered but include a prime (') suffix.

The control rod actuating mechanism comprises a fluid pressure cylinder or ram 14, including a piston 16 slidably disposed within a cylinder 18 in position for engagement with the lower end of a control rod or an actuating extension thereof. Due to the remote position of the actuating mechanism from the core of the reactor, it is believed that, in most instances, the piston will engage a rod 20 or the like which in turn is suitably interconnected at its upper end with the lower end of the neutron absorbing control rod (not shown). The lower end of the rod 20 extends downwardly from a position within the reactor vessel 12 and through an opening 22 having a suitable fluid pressure seal 24 for preventing the transfer of fluid pressure between the vessel 12 and the cylinder 18.

In the preferred embodiment, the cylinder 18 is in two sections, defined by a cross wall 26, and the piston 16 is of the pressure differential type in that it presents a greater surface area on the upper side than on the lower side thereof. The lower portion of the piston 16 includes an elongated portion 28 of reduced diameter having an axial bore or passage 30 extending a substantial distance upwardly from the lower end of the piston. The bore 30 provides means for receiving a long drive screw 32 which extends through an opening in the end of the piston and which coacts in a suitable manner with a nut 34 to effect axial movement of the piston 16 as the screw 32 is rotated. The lower end of screw 32 is suitably connected through a gear reduction box 36 to a suitable power driven means, such as an electric motor 38. The adjusting screw 32 and nut 34 may be of the ball type, wherein the load is transferred between the nut and screw through a series of ball bearings, and in such case the nut 34 is suitably keyed to the cylinder, as indicated by the key 37 which is slidable in a groove 39 formed in the side of the cylinder, in order to prevent rotation of the nut. The lower end of the piston 16 normally rests freely on nut 34 and the piston moves axially in response to axial movement of the nut as screw 32 is rotated. However, the piston is free to leave its seat on the nut and move upwardly in the cylinder.

Suitable controls (not shown) are provided for regulating the speed and direction of the motor driven screw 32, so as to selectively position the nut 34 along the screw shaft and thereby move the piston 16 and the control rod associated therewith. The position of the control rod can, of course, be registered in a suitable manner (not shown), as for example by means of an indicator which is geared to the screw shaft 32 or otherwise suitably arranged to register changes in position of the control rod.

The lower portion of the cylinder 18 which houses the control rod adjusting screw 32 is also in fluid communication with the reactor coolant system, so as to place the pressurized coolant in the cylinder 18 in position to operate against the lower side of the differential piston 16. A series of radially extending passages 35 in the lower end of piston section 28 provides fluid communication between chamber 30 and the lower portion of cylinder 18. In the illustrated embodiment, the pressurized coolant, which may be a suitable gas such as helium, carbon dioxide or the like, is preferably taken from a gas clean up system for the coolant, although it may be taken from any other pressurized portion of the system including the reactor vessel or one of the coolant inlets for the vessel. The coolant clean up system is indicated generally at 41 and includes suitable means (not shown) in fluid communication with the reactor vessel 12, through a pipe 43, for removing particles which may be picked up in the reactor, such as graphite dust or fission product contamination. A pipe or conduit 45 leads from the clean up system 41 to a gas and oil separator 40 and thence through pipes 42 to each of the control rod actuating cylinders 14. While the gas and oil separator may not be essential in all cases, it is recognized that there is likely to be an interchange of these fluids in the system, particularly in the cylinders 18 and, therefore, such separator may be advantageous.

The pressurized gas coolant thus introduced into the lower end of each control rod actuating cylinder, at substantially reactor pressure, flows through the passages 35 and acts against the piston surface 44 at the upper end of the axial passageway 30. Additional fluid pressure is introduced into the cylinder 18 in the upper chamber portion at a position between the piston and the gas chamber wall 26. Preferably, this additional pressure fluid is a hydraulic pressure fluid, such as oil which is derived from a system including an oil sump 46 and a main pump 48, with a stand-by pump 50 being provided as an additional safety factor. These pumps are preferably continuously operating, constant displacement type pumps and a suitable type of relief valve is placed in a by-pass conduit disposed intermediate the pressure side of each pump and the oil sump or reservoir 46. More particularly the main pump 48 is provided with a by-pass 56 and relief valve 54, and the emergency pump system includes a by-pass 55 and relief valve 57. Each pump discharge line is also provided with a one way valve, as indicated at 59 and 61, to prevent return flow of the hydraulic fluid, such as in the case of failure of the pump to continue operation.

The reservoir 46 is preferably maintained at subatmospheric pressures through the use of an evacuation pump 47 in the system. The hydraulic fluid is pumped through a main discharge line 58 having fluid communication with branch pipes 60 leading to each of the control rod actuating cylinders 14. The stand-by pump 50 is also connected with the main discharge line 58, by branch line 58a, for emergency use when needed. Branch line 58a provides return flow through pressure regulating valve 76 to the sump, valve 76 preventing return flow to the sump during normal operations and allowing such flow only in the event the pressure in line 58a exceeds some predetermined value at which valve 76 is set. Each rod actuating cylinder has associated therewith an accumulator tank 52 which provides additional safety in the event that there is a failure of both the main pump and the stand-by pump. In the latter instance, the pressure fluid stored in the accumulator tank 52 will supply sufficient pressure fluid to the ram 14 to achieve the desired results, as will be described more fully in following portions of this description.

The upper portion of the cylinder housing 18 receiving the hydraulic fluid pressure is sealed off from the lower portion of the cylinder containing the pressurized gas coolant through use of a suitable seal 62 seated in the cross wall 26. However, since it is presently difficult, as a practical matter, to provide an effective seal between a gas and a liquid under the conditions existent in the cylinder, it is preferable that the system include a suitable means for separating the gas and oil. Such means is indicated at 40 and comprises generally a float operated valve 64 which provides for a return of oil in the separator to the sump 46 when it reaches a predetermined level in the separator. Also, since it is quite likely that there will be a certain amount of leak around the seal 62, as well as around the seal 24 at the upper end of the cylinder 18, it is desirable to provide means including the pipes 63 and 65, respectively, for returning the packing leak off to the separator 40 through a common pipe 67.

The hydraulic fluid pressure is also supplied to each of the cylinders 14 at a position therein above the differential piston 16. In the illustrated embodiment, this is accomplished by a conduit 66, of reduced cross section relative to the branch discharge pipe 60, which is connected by a T 68 to an enlarged pipe 70 leading to a connection with cylinder 18 at a position at the upper end of the cylinder. The pipe 66 includes a solenoid control valve 71 intermediate the connection with pipe 60 and the T 68. The valve 71 is normally held in an open position, through electrical energy, to permit flow through the pipe 66. When the current to the solenoid is cut off, as on the "scram" signal, valve 71 closes in response to spring pressure. The other opening of the T 68 is connected with an exhaust or discharge manifold 72 through a solenoid operated control valve 74. The valve 74 requires electrical energy to maintain the valve in its closed position, and upon removal of such electrical energy the valve automatically moves to an open position in response to spring pressure on the valve. This control valve 74 comprises the emergency release or "scram" valve for the control rod engaged by the piston 16, and a similar valve is disposed in controlling relation to each of the cylinders for the other control rods in the system.

In the normal operation of the control rod, due to the differential piston 16, the total effective hydraulic pressure applied through the pipe 70 to the upper end of the differential piston 16 is considerably greater than that resulting from the hydraulic pressure introduced below the piston through the line 60 and the gas pressure introduced into the lower portion of the cylinder through the pipe 42. During ordinary control operation of the drive system, the balance of these fluid pressures is achieved through the electro-mechanically operated screw drive means for the piston 16. In other words, the position of the control rod is ordinarily governed by the position of the nut 34, as determined by the rotation of the motor driven screw 32. Thus, it is seen that the piston 16 controlling the position of each reactor control rod has acting thereon a gas pressure, a hydraulic fluid pressure, and an electro-mechanical force. In order to provide the most satisfactory degree of safety in the system, it is preferred that the magnitude of the hydraulic fluid pressure in the line 60 and the gas pressure in the lower pipe 42 are such that either one is sufficient to force the piston 16 upwardly at an acceleration of at least 1 $g$ when fluid pressure is removed from the top of the piston. That is, either of these pressures alone exerts a force which is at least twice the gravitation force of the control rod assembly on the piston 16. The total effect of both of these pressures operating together is, of course, much greater.

In an emergency situation within the reactor, which calls for a shut-down of the system through movement of the neutron absorbing control rods into the neutron field, the emergency signal is relayed through a suitable electrical circuit to release the electrical energy operating on the solenoid valve 74 and thereby permit this valve to move instantly to its open position. In this respect, it will be noted that in the event there is a failure of the electrical control circuit, the spring-biased, solenoid control valve 74 will automatically move to an open position of safety for the system. The opening of the valve 74 permits the immediate release of the hydraulic fluid pressure on the upper end of the piston 16 into the manifold 72 and thence to the sump or reservoir 46. In this latter respect, the manifold 72 is made of sufficiently larger size, relative to the fluid pressure pipe 70, to insure substantially instantaneous emptying or "dumping" of the pressure fluid from the upper end of the cylinder. Of course, during the "scram" operation of the valve 71 in line 66 is closed to prevent any return flow from the cylinder to the conduit 60. The removal of pressure fluid from the cylinder allows the hydraulic and gas pressures below the piston 16 to immediately move the piston to its uppermost position, which in turn results in positioning the neutron absorbing control rods fully within the reactor core. This "scram" movement of the piston is independent of the position or motion of the drive nut 34, since the piston is freely separable from the drive nut. Preferably, however, during the "scramming" operation the motor 38 is actuated to drive the shaft 32 and thereby move the nut 34 upwardly into engagement with the lower end of the piston 16 which has previously separated itself from the nut.

There are several features of safety with respect to the system described for emergency movement or "scramming" of the control rods. If the system is otherwise functioning normally, of course, the pump 48 will be operating and the scram control valve 74 will be instantaneously moved to its open position. In such instance, the combined fluid pressures in the pipes 60a and 42 will "scram" the rods. In the event that the electrical control circuit has become defective and the power to the solenoid check valve 74 is thereby shut off, this spring-biased valve will automatically move to its open position under spring pressure and the "scramming" operation will proceed. Furthermore, should there be a defect in the system, so as to prevent both of the hydraulic pumps 48 and 50 from operating and supplying pressure fluid to the cylinder 18, the system is designed so that such failure will not affect the emergency introduction of hydraulic fluid pressure through the pipe 60a into the cylinder.

More particularly, the upper portion of the accumulator tank 52 is filled with a compressible gas, such as pressurized helium, or the like, and the pressure in the tank is maintained at a predetermined level. As shown in the drawing, this is accomplished through a T connection at the upper end of tank 52, which is in fluid communication, through a pipe 75, with a source of gas pressure which may be the helium pressure supply in the reactor system or a suitable independent source. Flow of the pressure gas into the accumulator tank 52 is controlled by a solenoid controlled valve 77 which is held open by electrical energy and which is spring biased into a closed position. The other outlet of the T connection includes a suitable relief valve 79 and a pipe 81 communicating with the helium supply or other pressure source. Of course, the relief valve 79 cooperates with the pressure gas in pipe 75 and in the accumulator tank 52 to maintain a desired amount of pressure in the tank.

When the "scram" signal is initiated by the attainment of a dangerous condition in the reactor system, the "scram" control valve 74 is opened and fluid from the upper portion of the cylinder 18 is immediately discharged, through pipe 70, into the exhaust manifold 72. The hydraulic fluid below the piston 16 cannot return through the pipe 60 and the pump discharge line 58, since the pump is provided with a one-way discharge valve 76. Further, the attempt of this pressure fluid to escape through the pipe 66 into the exhaust manifold is prevented by the closing of valve 71, which is also effected at the "scram" signal. Moreover, the release of pressure on the upper side of the piston 16 is accompanied by an expansion of the fluid on the lower side of the piston, which, in turn, affords an expansion of the compressed gas in the accumulator tank 52 to push the reserve pressure fluid therein downwardly and into the cylinder 18, through the pipe 60a, to augment the expanding pressure fluid acting against the lower end of the piston. In this respect, the valve 77 will be closed upon "scram" so that sufficient pressure is trapped in the tank 52 to achieve the described results, i.e. to produce the necessary surge of fluid pressure through the pipe 60a toward the lower face of piston 16. At the same time, of course, the gas pressure in the coolant system is also acting against the lower portion 44 of the piston 16, and the combination of this gas pressure with the hydraulic fluid pressure entering the cylinder through pipe 60a moves the control rod into its safe position within the reactor core.

Moreover, even if the hydraulic fluid pressure in the system should fail, there is still adequate gas pressure in the lower portion of the cylinder 18 to effect the desired "scramming" operation. Since this gas pressure is derived from the reactor system and, therefore, is independent of any power source which may be subject to failure, the gas pressure will be effective to provide a "scramming" of the control rods as long as the reactor is functioning.

It is seen, therefore, that there is provided herein an instantaneous and effective safety control for the neutron absorbing control rods which govern the reactivity of the reactor. It will be understood, of course, that the described system might be employed only in connection with a sufficient number of safety rods to effect a shut-down of the reactor in the event of an emergency, or it might be used in connection with all control rods, whether they are safety rods, regulating rods or shim rods. Although the operation has been chiefly described with respect to a single control rod drive means, others might be incorporated in the system in any suitable manner such as shown in connection with the second control rod actuating mechanism 14' illustrated in the drawings.

As indicated above, upon receiving a "scram" signal, the described system moves the control rods 10 upwardly at a high speed under hydraulic and pneumatic pressure, with the piston 16 becoming separated from its drive screw 32. As an additional safety measure, it is preferred that the motor 38 for the drive screw 32 be also operated in response to the scram signal, so that the drive nut 34 follows the piston to its uppermost position. Further, it is desirable that a suitable interlock (not shown) be provided between the drive nut and the circuit controlling the solenoid valve 74, so that the scram valve 74 will not be closed until the drive screw 32 has moved into a position of engagement with the lower end of the piston 16. In this way, the drive nut 34 is again placed in controlling relation to the piston 16 before the control rod can be moved downwardly to permit a return of reactivity in the reactor.

Although shown and described with respect to particular apparatus and with respect to a gas cooled reactor, it will be apparent that various modifications might be made without departing from the principles of the invention, and that such system might be used in connection with other types of reactors.

We claim:

1. In combination with a neutronic reactor having a vessel containing an active portion adapted to maintain a self-sustaining neutronic reaction, a neutron absorbing control rod movable upwardly into and downwardly away from the neutron field of the reactor to vary the neutron losses in the field, and having a pressurized fluid coolant circulating through the reactor vessel, an improved control rod drive means comprising a generally vertical cylinder, a piston slidable in said cylinder, means connecting said piston with the control rod to afford axial movement of said control rod relative to the neutron field in response to movement of said piston, power driven means connected with said piston to move the latter axially and thereby adjust the position of said control rod, said connection between said piston and said power driven means including means providing a positive drive of the piston by said power means but permitting said piston to be separated from said drive means for upward relative movement of said piston, means placing the lower side of said piston in fluid communication with the pressurized fluid coolant for the reactor, additional means placing the upper side of said piston in fluid communication with a second source of pressure fluid which exerts a greater pressure on said piston than said pressurized fluid coolant, means for substantially instantaneously relieving said pressure on the upper side of said piston in response to the establishing of a predetermined condition in said reactor and release means for simultaneously releasing said power driven means from said piston, whereby said fluid pressure on the lower side of said piston causes the latter to become separated from said power driven means and substantially instantaneously move upwardly and position said control rod into its full position of neutron absorption within the neutron field.

2. In combination with a gas-cooled neutronic reactor wherein the gas coolant in the system is under relatively high pressure during the operation of the reactor, an improved control rod system comprising a neutron absorbing control rod which is disposed for movement upwardly into and downwardly away from the neutron field in the reactor vessel to vary the neutron losses in the field, said rod being movable upwardly from a position below the neutron field, a control rod drive means including a generally vertically disposed cylinder, a piston movable in said cylinder, means connecting said piston with said control rod to provide axial movement of the latter in response to movement of said piston, power driven means connected with said piston to adjustably urge the latter upwardly, said connection between said piston and said power driven means including means providing a positive drive of the piston but permitting said piston to become separated from said drive means for relative upward movement of said piston, means affording fluid communication between the lower side of said piston and the pressurized gas coolant for the reactor, additional means placing the upper side of said piston in fluid communication with an additional source of pressure fluid wherein the pressure thereby exerted on the upper side of said piston is greater than the pressure of said gas coolant on the lower side of said piston, said power driven means being effective to move said piston upwardly against said greater pressure fluid force on said piston, means for relieving the fluid pressure on the upper side of said piston in response to a predetermined condition in said reactor and release means for simultaneously releasing said power driven means from said piston, whereby said gas-coolant pressure on the lower side of said piston causes the latter to separate from said power driven means and move upwardly to position said control rod into its full position within the neutron field.

3. In combination with a gas-cooled neutronic reactor wherein the gas coolant is under relatively high pressure during operation of the reactor, an improved control rod system comprising a neutron absorbing control rod disposed for upward and downward movement in the neutron field in the reactor vessel from a position below the field to vary neutron losses in said field, a control rod drive means including a generally vertically disposed cylinder constructed to provide first, second and third separate chamber portions therein, a piston disposed in said cylinder, said piston being provided with first and second lower surface portions disposed to receive upwardly directed fluid pressure in the first and second chambers, respectively, and an upper surface larger in area than the aggregate of said lower surface portions disposed to receive downwardly directed fluid pressure in the third of said chambers, means transmitting axial movement coupling said piston and control rod, means communicating the fluid pressure of said gas coolant to the first chamber, means communicating a separate fluid pressure to the second and third chamber of such a magnitude that the pressure on said upper surface of the piston is in excess of the aggregate pressure on the lower surface portions thereof, powered rod adjusting driving means, means coupling the driving means to drive said piston upwardly against said excess pressure, said coupling means being arranged to detach the driving means from the piston on independent upward movement of said piston, and means for relieving the fluid pressure on the upper surface of said piston in response to a predetermined condition in said reactor, whereby the aggregate fluid pressures on the lower surfaces drives said piston upwardly positioning the control rod in full neutron absorption position within the neutron field.

4. In combination with a gas-cooled neutronic reactor wherein the gas coolant is under relatively high pressure, an improved control rod drive system comprising a plurality of neutron absorbing control rods disposed for reciprocating movement relative to the neutron field of the reactor to vary neutron losses therein from a position below the field, a plurality of control rod drive means including a generally vertically disposed cylinder constructed to provide first, second and third separate chamber portions therein, a piston disposed in said cylinder, said piston being provided with first and second lower surface portions disposed to receive upwardly directed fluid pressure in the first and second cylinder chambers, respectively, and an upper surface larger in area than the aggregate of said lower surface portions disposed to receive downwardly directed fluid pressure in the third of said chambers, said downwardly directed pressure being in excess of the aggregate of the upwardly directed pressures, means transmitting axial movement individually coupling said pistons to said control rods, means communicating the coolant gas pressure to each of the first of said chambers, a hydraulic pressure source, a first conduit means connecting said pressure source to each of said second chambers, a fluid pressure accumulator having a pressure gas source coupled thereto and communicating with the first conduit means, a second conduit means placing each of said third chambers in communication with said first conduit means intermediate said source and accumulator, said second conduit means including first pipes including a normally open electrically controlled valve controlling fluid flow therethrough and being connected to the first conduit means, second pipes of relatively large internal diameter connecting an individual one of said first pipes with an individual one of the third chambers of said cylinders, an exhaust pipe leading from each of said second pipes and including a second normally open electrically controlled valve controlling fluid flow from second pipe into said exhaust pipe, a plurality of powered rod adjusting driving means, and means coupling an individual of said driving means to drive an individual one of said pistons upwardly against the excess of said downwardly directed pressure, said coupling means being arranged to detach said driving means from the piston on independent upward movement of the piston, whereby said second control valve when closed applies said excess pressure restraining the piston and rod in a downward position and whereby release of the fluid pressure from the third chamber through the second valve allows either one or the aggregate of the pressures in the first and second chambers to move the piston upwardly urging the control rod into full neutron absorbing position in the neutron field.

5. A fluid motor comprising a cylinder, an elongated differential piston axially slidable within said cylinder, said piston having a cylindrical section of relatively enlarged cross sectional area at one end and an elongated section of reduced cross sectional area extending axially of said enlarged section and formed integrally therewith, a transverse wall formed within said cylinder intermediate the ends thereof and including a central opening affording sliding movement of said reduced piston section therethrough, said reduced piston section including an elongated axial chamber therein terminating at the free end of said section in an axial opening, a screw drive shaft in said cylinder, a nut arranged on said screw drive shaft in position for separable engagement with said free end of said piston, said nut being keyed with reference to said cylinder to prevent rotation thereof so that rotation of said screw drive shaft produces axial movement of said nut and said piston and affording movement of said piston relative to said screw drive shaft and away from said nut, means affording the introduction of pressure fluid into said piston chamber, means affording the introduction of pressure fluid into said cylinder at a position intermediate said transverse wall and said enlarged piston section, and means affording the introduction of pressure fluid into said cylinder at the end thereof adjacent to said one end of said piston.

References Cited in the file of this patent
UNITED STATES PATENTS

| | | |
|---|---|---|
| 2,476,376 | Laraque | July 19, 1949 |
| 2,630,829 | Shafer | Mar. 10, 1953 |
| 2,660,026 | Geyer | Nov. 21, 1953 |

OTHER REFERENCES

Harrer: Nucleonics, vol. 13 (June 1955), 48–51.